July 22, 1969  E. WIELAND  3,456,901
TOWING CABLE ATTACHMENT MECHANISM FOR
WINGLESS TOWED AIRCRAFT
Filed Sept. 16, 1966  2 Sheets-Sheet 2

INVENTOR

ERNST WIELAND

BY *James E. Bryan*
ATTORNEY

United States Patent Office 3,456,901
Patented July 22, 1969

3,456,901
TOWING CABLE ATTACHMENT MECHANISM
FOR WINGLESS TOWED AIRCRAFT
Ernst Wieland, Langenargen, Germany, assignor to Dornier System G.m.b.H., Friedrichshafen, Germany, a corporation of limited-liability of Germany
Filed Sept. 16, 1966, Ser. No. 580,040
Claims priority, application Germany, Sept. 17, 1965, D 48,228
Int. Cl. B64d 3/00; F41j 9/10
U.S. Cl. 244—3            5 Claims

ABSTRACT OF THE DISCLOSURE

A wingless towed aircraft is provided with a towing cable attachment including a cable having an end thereof secured to a first cable-securing means mounted at the exterior of the towed aircraft and positioned in the area of the center of gravity thereof. A second cable-securing means is mounted at the nose of the aircraft for securing an intermediate portion of the cable. Means is provided for disconnecting the cable from the second securing means during the towing operation whereby the aircraft is towed from the first cable-securing means and may be readily retracted to the towing aircraft.

---

Figure 1:
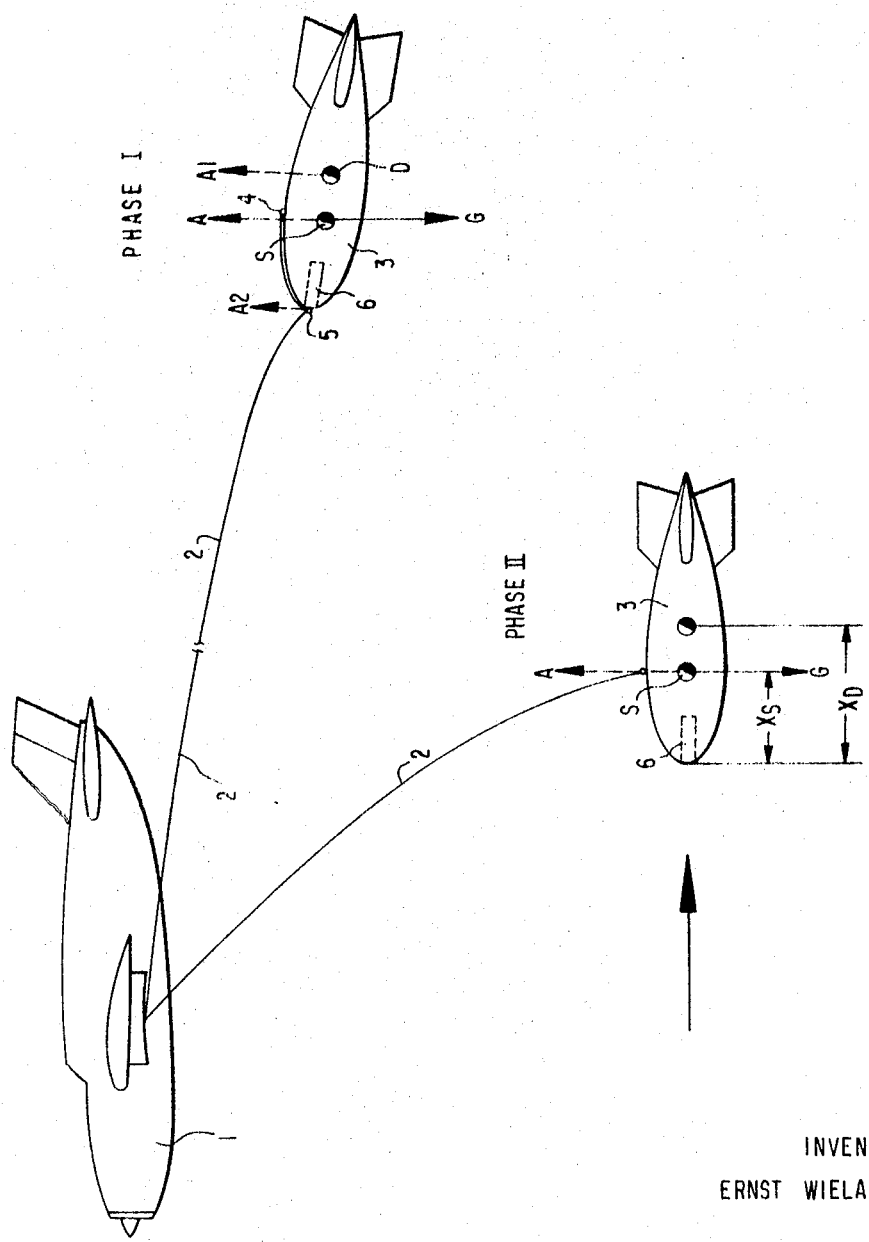

This invention relates to a towing cable attachment mechanism for wingless towed aircraft, which latter are used as aerial targets.

Towed aircraft without wings or airfoils, which are employed as aerial targets, themselves produce only a part of the required lifting force and the remaining portion thereof is produced by the vertical component of the towing cable. The result is that the towing cable is bent downwardly in the rearmost area thereof and the magnitude of this bend or curvature essentially determines the resistance of the towing cable, since the resistance depends upon the angle of incidence of the cable. It is known that the vertical traction component of the towing cable, and the downward curvature or bend thereof, may be maintained very small if the securing or attachment point of the cable is mounted at the nose of the towed aircraft. In the case, the larger portion of the lifting force is absorbed by the stabilizing fins since the pressure point is positioned behind the center of gravity. In this arrangement, the air resistance of the entire assembly is relatively small.

When the attachment or securing of the cable is effected at the nose of the towed aircraft, difficulties arise, however, during the retraction operation. During retraction, the towed aircraft comes into the area of the tail unit or group of the towing aircraft and may endanger the latter in the case of pendulum movements which may be caused, for example, by propeller turbulence or aircraft downwash. A further problem is the mooring of the towed aircraft at the mooring support. Known devices employ nose prongs or the like at the towed aircraft and pull these into a guide, or the entire towed aircraft is anchored at the nose with the aid of a basket-like device. Both types of mount or support are undesirable for static reasons because of the large moments which are transmitted from the aircraft to the supporting point.

The mounting or attachment difficulties at the towing aircraft and the danger to the tail unit during the retraction operation do not arise in another known type of anchoring, i.e., the center of gravity tow. In the latter, the vertical load or stress on the towing cable is greater, i.e., it is approximately equal to the empty or net weight of the towed aircraft. As a result, the towing cable is bent downwardly to a greater degree. During the retraction operation, the aircraft thus approaches the supporting device or mooring on a very steep path or course and does not, therefore, endanger any parts of the towing aircraft. The clamping or securing of the towed aircraft to the mooring device may be effected in a simpler and statically more favorable manner since the anchoring and supporting point is positioned in proximity to the center of gravity. The center of gravity tow, however, has one great disadvantage. Due to the greater bend or curvature of the cable, the resistance of the latter is very great. This, in turn, results in the requirement that the cable be thicker because of the increased tensile stress and this, in turn, contributes again to an increase of the total resistance of the assembly.

The present invention provides an attachment mechanism for towed aircraft in which the advantages of the center of gravity tow are combined with the advantages of the nose tow while the disadvantages of the known constructions are effectively eliminated.

In the present invention, the end of the towing cable is connected to a first securing means mounted at the outer skin of the towed aircraft and within the area of the center of gravity of the latter. The towing cable then is guided from the first securing means over the outside of the towed aircraft to a second cable-securing means mounted at the nose of the towed aircraft. The second cable-securing means can be disconnected whenever desired during the towing operation.

A towing cable attachment mechanism which is constructed in this manner combines the advantages of the nose tow of a towed aircraft while in flight with the advantages of the center of gravity tow during the retraction operation.

Figure 2:
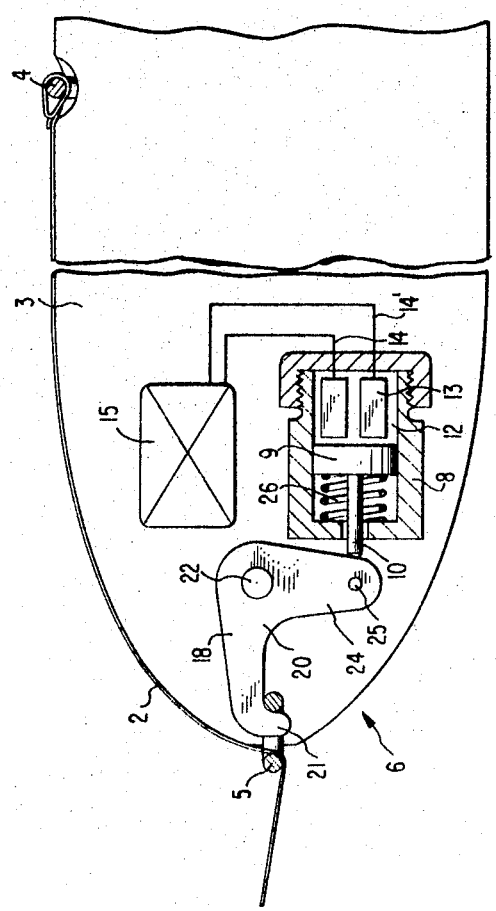

One embodiment of the invention is further illustrated in the accompanying drawings in which:

FIGURE 1 shows the conditions existing during towed flight when the cable is secured to the nose of the towed aircraft (phase I) and when the cable is secured directly to the securing means mounted in the area of the center of gravity of the towed aircraft (phase II), and FIGURE 2 shows the means for disconnecting the cable from the nose of the towed aircraft.

Referring to FIGURE 1, reference numeral 1 identifies the towing aircraft. The towing cable 2 and the towed aircraft 3 are illustrated in two phases of the towing operation which are different with respect to time. Phase I shows the conditions existing during the performance of a flying mission, for example, during the time when the towed aircraft is employed as an aerial target. The end of the towing cable is secured to a securing means or mounting support 4 on the towed aircraft 3, the support 4 being positioned within the area of the center of gravity S, and the cable is guided from there along the outer contour of the towed aircraft to a second point of attachment 5 at the front or nose of the towed aircraft 3, which second attachment or securing means is constructed as a ring in the embodiment illustrated. The point of attachment 5 corresponds to the forward profile point of the towed aircraft 3. Reference symbol D designates the pressure point, which is the point of intersection of the aerodynamic force resultant with the longitudinal profile axis. For reasons pertinent to flight stability, the center of gravity S of the towed aircraft must be positioned forward of the pressure point in the direction of flight. In the illustrated embodiment, the distance between the forward profile point 5 and the center of gravity S and the distance between the point 5 and the pressure point D has been identified by $X_S$ and $X_D$, respectively, the distance $X_S$ being $<X_D$.

During the flight of the towed aircraft 3, an equilibrium of forces is created in a manner such that the empty or net weight G of the towed aircraft is compensated by the partial lifting force A1 which acts at the pressure point D and which is composed, in turn, of the lift of the stabilizer fins and the lift of the towed aircraft fuselage, as well as of the partial lifting force A2 which acts at the nose-anchoring point 5 and is supplied by the vertical component of the towing cable. Since the partial lifting force A2 acts with a greater lever arm than the partial lifting force A1, both may be kept correspondingly small. The downward curvature or bend of the towing cable remains small, accordingly, and also the resistance of the towing cable is low. A lower towing cable resistance is desirable not only because less power is required in the towing aircraft but also because the towing cable, which is constructed with a small diameter in order to facilitate reeling thereof and to reduce aerodynamic drag, should be subjected to as small a tensile stress as possible.

The transition from phase I to phase II is effected prior to the retraction operation of the towed aircraft 3 and is initiated by a disengagement of the ring 5 effecting the anchoring of the towing cable to the nose of the towed aircraft. The disconnecting operation is effected using the means 6 which is actuated by remote control. The new securing or attachment point of the towed aircraft 3 is now the mounting support 4 positioned at the outer contour of the towed aircraft within the area of the center of gravity thereof. In this longitudinal moment-free attachment, the entire weight G of the towed aircraft 3 acting within the center of gravity S must be counteracted by the vertical cable component which also acts approximately in the center of gravity S. The vertical cable component, being increased as compared to phase I, effects a greater deflection of the towing cable 2 in the downward direction and the vertical interval of the towed aircraft 3 with respect to the tow plane 1 is thereby increased. Both tendencies are utilized in the retraction operation in the present invention. The retraction of the towed aircraft in the direction of flight thus may be effected at a sufficiently large vertical distance from the tail unit of the towing aircraft and an attenuation of the movements of the towed aircraft in the direction of flight results.

Furthermore, the mooring of the towed aircraft at the towing aircraft may be effected very favorably by means of simple supports about the securing means 4, which latter is positioned in the area of the center of gravity. Since the total cable length is continuously reduced during the retraction operation, the increased towing cable resistance produce during the center of gravity tow is correspondingly reduced.

FIGURE 2 illustrates one embodiment of the construction of the securing means for the towing cable 2. Reference numeral 8 designates the housing of a switch which is constructed in this case as a cylinder and contains a piston 9 with a plunger 10 connected thereto and projecting out of the cylinder 8. The piston forms a cylindrical space 12 in which are positioned the blasting caps 13. These blasting caps are connected by means of detonator cables 14 and 14', respectively, to an ignition-controlling device which may be operated by remote control from a transmitter positioned in the tow plane. A hook 21 engages in the ring 5 receiving the towing cable 2, the hook 21 being positioned on one arm 18 of a two-arm lever or crank 20. The lever or crank 20 is pivotal about a supporting shaft 22 rigidly connected to the towed aircraft 3 and a shear pin 25 rigidly connected to the towed aircraft passes through the second lever arm 24.

The operation of the mechanism is as follows: In phase I, the towing cable 2 is guided through the opening in the ring 5 and extends along the outer contour of the towed aircraft to the point of attachment 4, which latter is positioned within the area of the center of gravity S. When it is desired to retract the towed aircraft, a control or pilot pulse is transmitted from the tow plane to the ignition means 15 and the blasting caps 13 are detonated by means of the cables 14 and 14', respectively. The pressure thus produced within the cylinder space 12 moves the piston 9 to the left against the action of the return spring 26, which causes the plunger 10 to act on the arm 24 of the double-arm lever 20. The pin 25 is sheared and the lever 20 rotates about the axis 22 while the hook 21 is moved out of the ring 25. The towing cable thus is released from the forward profile point of the towed aircraft so that the attachment of the cable to the towed aircraft is now positioned in the area of the center of gravity S. The towed aircraft now can be retracted as described above without danger to the tail unit of the tow plane and may be moored to the latter.

What is claimed is:

1. A towing cable attachment mechanism for wingless towed aircraft which comprises a cable, first cable-securing means mounted at the exterior of the aircraft and positioned in the area of the center of gravity of the latter securing the end of said cable, second cable-securing means mounted at the nose of the aircraft securing an intermediate portion of said cable, and means for disconnecting the cable from the second securing means during a towing operation, whereby said aircraft is towed from said first cable-securing means.

2. An attachment mechanism according to claim 1 in which the means for disconnecting the cable includes a pivotal lever actuated by a plunger and piston.

3. An attachment mechanism according to claim 2 in which the piston is actuated by explosive means.

4. An attachment mechanism according to claim 3 in which the explosive means is actuated by remote control means.

5. A towing cable attachment mechanism for a wingless towed aircraft comprising a one-piece cable having an end thereof secured to said towed aircraft, the opposite end of the cable being connected to a towing aircraft, an intermediate portion of said cable extending freely through a ring-like means on said towed aircraft spaced from the point where said end of the cable is secured to the towed aircraft, holding means for holding said ring-like means in place, and means for selectively releasing said holding means to release said ring-like means.

References Cited

UNITED STATES PATENTS

| | | | |
|---|---|---|---|
| 2,991,960 | 7/1961 | McNutt et al. | 244—3 |
| 3,135,511 | 6/1961 | Norman et al. | 244—3 X |

FERGUS S. MIDDLETON, Primary Examiner

RICHARD A. DORNON, Assistant Examiner